(12) United States Patent
Yoshida

(10) Patent No.: US 11,046,187 B2
(45) Date of Patent: Jun. 29, 2021

(54) ELECTRICALLY DRIVEN VEHICLE

(71) Applicant: TOYOTA JIDOSHA KABUSHIKI KAISHA, Toyota (JP)

(72) Inventor: Hiroshi Yoshida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 367 days.

(21) Appl. No.: 16/181,896

(22) Filed: Nov. 6, 2018

(65) Prior Publication Data

US 2019/0160946 A1    May 30, 2019

(30) Foreign Application Priority Data

Nov. 29, 2017    (JP) ............................. JP2017-228739

(51) Int. Cl.
| | | |
|---|---|---|
| B60L 3/12 | (2006.01) | |
| B60L 3/00 | (2019.01) | |
| B60L 58/10 | (2019.01) | |
| B60L 7/14 | (2006.01) | |
| B60L 58/21 | (2019.01) | |
| B60L 58/15 | (2019.01) | |

(52) U.S. Cl.
CPC .......... *B60L 3/0007* (2013.01); *B60L 3/0046* (2013.01); *B60L 3/0084* (2013.01); *B60L 3/12* (2013.01); *B60L 7/14* (2013.01); *B60L 58/10* (2019.02); *B60L 58/15* (2019.02); *B60L 58/21* (2019.02); *B60L 2240/547* (2013.01); *B60L 2240/549* (2013.01); *B60Y 2200/91* (2013.01)

(58) Field of Classification Search
None
See application file for complete search history.

(56) References Cited

U.S. PATENT DOCUMENTS

| | | | | |
|---|---|---|---|---|
| 2010/0244847 A1* | 9/2010 | Kudo | ................... | B60L 3/0084 |
| | | | | 324/433 |
| 2011/0001352 A1* | 1/2011 | Tamura | ................... | B60L 58/15 |
| | | | | 307/9.1 |
| 2013/0279056 A1* | 10/2013 | Ohnuki | ................... | B60L 58/19 |
| | | | | 361/86 |
| 2014/0152261 A1* | 6/2014 | Yamauchi | ............ | G01R 31/396 |
| | | | | 320/118 |
| 2017/0274775 A1 | 9/2017 | Kamata | | |

FOREIGN PATENT DOCUMENTS

| | | |
|---|---|---|
| JP | 2009-042071 A | 2/2009 |
| JP | 2010-057284 A | 3/2010 |
| JP | 2013-235689 A | 11/2013 |
| JP | 2014-017901 A | 1/2014 |
| JP | 2017-175871 A | 9/2017 |

* cited by examiner

*Primary Examiner* — James M McPherson

(74) *Attorney, Agent, or Firm* — Sughrue Mion, PLLC

(57) ABSTRACT

An electrically driven vehicle comprises a battery configured by connecting a plurality of cells in series; and a motor configured to transmit electric power to and from the battery. When an abnormality occurs in a cell voltage detection system configured to detect cell voltages of the respective cells of the battery, the electrically driven vehicle prohibits regenerative control of the motor. The electrically driven vehicle determines whether the battery is being charged, based on an open circuit voltage of a block that is comprised of at least two or more cells among all the cells constituting the battery. The open circuit voltage of the block is calculated from a voltage of the block and a battery current flowing in the battery.

4 Claims, 2 Drawing Sheets

ELECTRICALLY DRIVEN VEHICLE

CROSS-REFERENCE TO RELATED APPLICATION

This application claims priority to Japanese Patent Application No. 2017-228739 filed on Nov. 29, 2017, the contents of which is incorporated herein by reference.

TECHNICAL FIELD

The present disclosure relates to an electrically driven vehicle and more specifically to an electrically driven vehicle provided with a battery configured by connecting a plurality of cells in series and a motor configured to transmit electric power to and from the battery.

BACKGROUND

A proposed configuration of an electrically driven vehicle includes an assembled battery that is configured by connecting a plurality of cells in series, a motor configured to receive supply of electric power from the assembled battery, a control microcomputer configured to monitor the state of each of the cells constituting the assembled battery, and a monitor microcomputer configured to monitor whether the control microcomputer is normally operated (as described in, for example, JP 2014-17901A). In the electrically driven vehicle of this configuration, when an abnormality occurs in the control microcomputer, the monitor microcomputer determines an allowable driving time, based on the remaining charge of the assembled battery, and continues the power supply from the assembled battery until elapse of the allowable driving time.

CITATION LIST

Patent Literature

PTL 1: JP2014-017901A

SUMMARY

In the electrically driven vehicle of the above configuration, however, since an abnormality occurs in the control microcomputer, the control microcomputer fails to normally monitor the state of each of the cells constituting the assembled battery. In the case where the motor is often under regenerative control, for example, during deceleration, the assembled battery may be overcharged. Overcharging the assembled battery may result in damage of the cells.

An electrically driven vehicle of the present disclosure mainly aims to determine whether a battery is being charged when an abnormality occurs in a detection system of voltages of respective cells constituting the battery.

In order to achieve the above primary object, the electrically driven vehicle of the disclosure is implemented by an aspect described below.

According to one aspect of the present disclosure, there is provided an electrically driven vehicle including a battery configured by connecting a plurality of cells in series, a motor configured to transmit electric power to and from the battery, and a control device configured to drive and control the motor. When an abnormality occurs in a cell voltage detection system configured to detect cell voltages of the respective cells of the battery, the control device prohibits regenerative control of the motor and determines whether the battery is being charged, based on an open circuit voltage of a block that is comprised of at least two or more cells among all the cells constituting the battery. The open circuit voltage of the block is calculated from a voltage of the block and a battery current flowing in the battery.

When an abnormality occurs in the cell voltage detection system configured to detect the cell voltages of the respective cells constituting the battery, the electrically driven vehicle of this aspect prohibits the regenerative control of the motor. The electrically driven vehicle of this aspect subsequently determines whether the battery is being charged, based on the open circuit voltage of the block that includes at least two cells among all the cells constituting the battery. The open circuit voltage of the block is calculated from the voltage of the block and the battery current flowing in the battery. This configuration allows for the determination of whether the battery is being charged, even when an abnormality occurs in the cell voltage detection system. The block includes two or more cells that are connected in series and may be an entire cell stack or may be part of a cell stack.

DESCRIPTION OF EMBODIMENTS

The following describes aspects of the present disclosure with reference to some embodiments.

Figure 1:
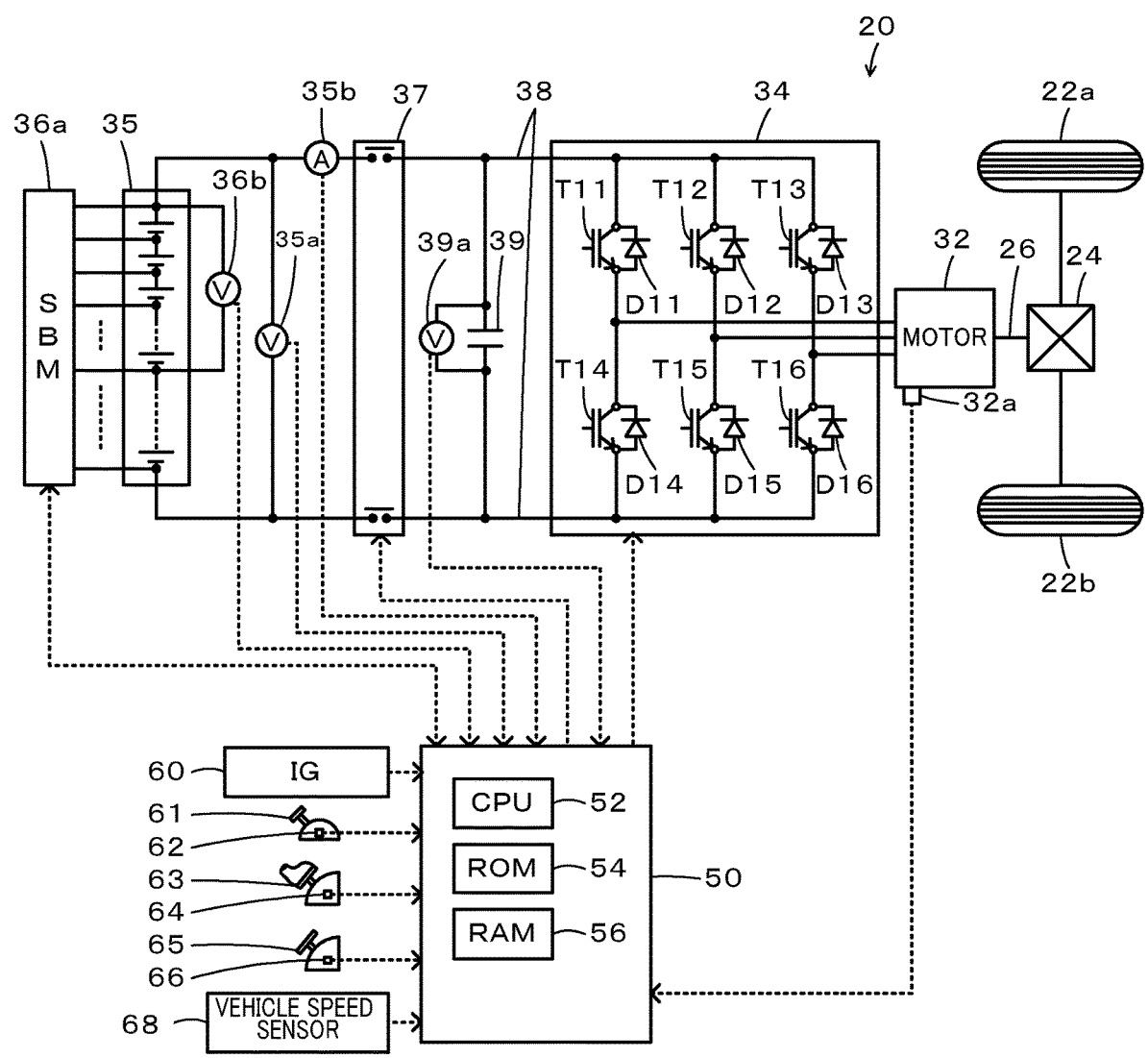
FIG. 1 is a configuration diagram illustrating the schematic configuration of an electric vehicle according to one embodiment of the present disclosure.

FIG. 1 is a configuration diagram illustrating the schematic configuration of an electric vehicle 20 according to one embodiment of the present disclosure. As illustrated, the electric vehicle 20 of the embodiment includes a motor 32, an inverter 34, a battery 35, a system main relay 37 and an electronic control unit 50.

The motor 32 is configured as a synchronous motor generator having a rotor with permanent magnets embedded therein and a stator with three-phase coils wound thereon. The rotor of this motor 32 is connected with a driveshaft 26 that is coupled with drive wheels 22a and 22b via a differential gear 24.

The inverter 34 is used to drive the motor 32 and is connected with the battery 35 via power lines 38. This inverter 34 includes six transistors T11 to T16 serving as six switching elements and six diodes D11 to D16 respectively connected with the six transistors T11 to T16 in parallel. The transistors T11 to T16 are arranged in pairs, such that two transistors in each pair respectively serve as a source and a sink relative to a positive electrode line and a negative electrode line of the power lines 38. The respective phases of the three-phase coils (U phase, V phase and W phase coils) of the motor 32 are connected with connection points of the respective pairs of the transistors T11 to T16. When a voltage is applied to the inverter 34, the electronic control unit 50 serves to regulate the rates of ON times of the respective pairs of the transistors T11 to T16, such as to form a rotating magnetic field in the three-phase coils and thereby rotate and drive the motor 32.

The battery 35 is configured by connecting a plurality of cells of, for example, a lithium ion rechargeable battery or a nickel metal hydride battery in parallel and is connected with the inverter 34 via the power lines 38 as described above. The system main relay 37 and a capacitor 39 are mounted to the positive electrode line and the negative electrode line of the power lines 38.

The motor electric control unit 50 is configured as a CPU 52-based microprocessor and includes a ROM 54 configured to store processing programs, a RAM 56 configured to temporarily store data and input/output ports in addition to the CPU 52. Signals from various sensors are input into the electronic control unit 50 via the input port. The signals input into the electronic control unit 50 include, for example, a rotational position θm from a rotational position detection sensor (for example, resolver) 32a configured to detect the rotational position of the rotor of the motor 32 and phase currents from current sensors (not shown) configured to detect the phase currents of the respective phases of the motor 32. The input signals also include a voltage VB of the battery 35 from a voltage sensor 35a placed between terminals of the battery 35, an electric current Ib of the battery 35 (battery current Ib) from a current sensor 35b mounted to an output terminal of the battery 35, cell voltages Vcel of the respective cells from an SBM (satellite battery module) 36a connected with the respective cells of the battery 35, a block voltage Vb from a voltage sensor 36b mounted to a cell block consisting of a predetermined number of cells (for example, 10 cells or 20 cells) included in the battery 35, and a voltage VH of the capacitor 39 (power lines 38) (inverter input voltage VH) from a voltage sensor 39a placed between terminals of the capacitor 39. The input signals additionally include an ignition signal from an ignition switch 60 and a shift position SP from a shift position sensor 62 configured to detect an operating position of a shift lever 61. The input signals further include an accelerator position Acc from an accelerator pedal position sensor 64 configured to detect a depression amount of an accelerator pedal 63, a brake pedal position BP from a brake pedal position sensor 66 configured to detect a depression amount of a brake pedal 65, and a vehicle speed V from a vehicle speed sensor 68. The electronic control unit 50 outputs, for example, switching control signals to the transistors T11 to T16 of the inverter 34 and a driving signal to the system main relay 37 via the output port. The electronic control unit 50 calculates an electrical angle θe and a rotation speed Nm of the motor 32, based on the rotational position θm of the rotor of the motor 32 input from the rotational position detection sensor 32a.

In the electric vehicle 20 of the embodiment having the above configuration, the electronic control unit 50 sets a required torque Td* for the driveshaft 26, based on the accelerator position Acc and the vehicle speed V, and performs switching control of the the transistors T11 to T16 included in the inverter 34, such as to drive the motor 32 with a torque command Tm*, according to a control routine (not shown).

Figure 2:
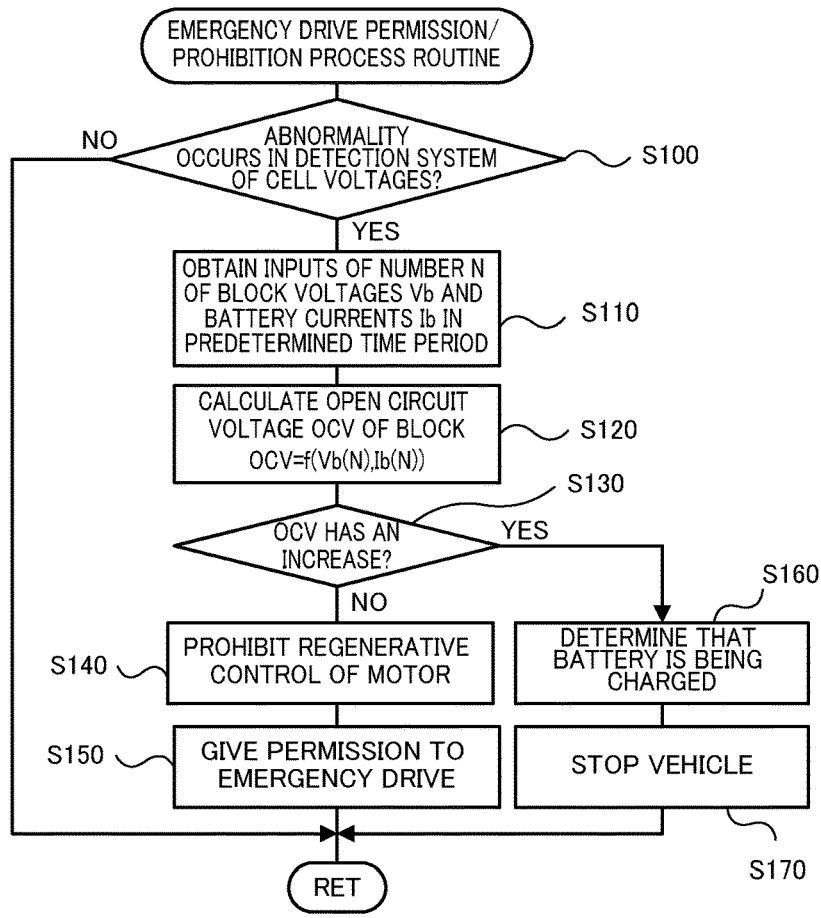
FIG. 2 is a flowchart showing one example of an emergency drive permission/prohibition process routine performed by an electronic control unit according to the embodiment.

The following describes the operations of the electric vehicle 20 of the embodiment or more specifically a series of operation in the event of an abnormality occurring in a detection system of the cell voltages Vcel. FIG. 2 is a flowchart showing one example of an emergency drive permission/prohibition process routine performed by an electronic control unit 50 according to the embodiment in order to enable emergency drive even when an abnormality occurs in the detection system of the cell voltages Vcel. This routine is performed repeatedly at predetermined time intervals.

When the emergency drive permission/prohibition process routine is triggered, the CPU 52 of the electronic control unit 50 first determines whether any abnormality occurs in the detection system of the cell voltages Vcel (step S100). The abnormality possibly occurring in the detection system of the cell voltages Vcel may be, for example, disconnection of a signal line from each of the cells constituting the battery 35 to the SBM 36a or a communication failure between the SBM 36a and the electronic control unit 50. According to the embodiment, an abnormality diagnosis process (not shown) is performed in advance to diagnose whether any abnormality occurs in the detection system of the cell voltage Vcel, and the result of the abnormality diagnosis is stored in a predetermined area of the RAM 56. The CPU 52 reads out the result of the abnormality diagnosis stored in the predetermined area of the RAM 56 and determines whether any abnormality occurs in the detection system of the cell voltages Vcel at step S100. When it is determined that no abnormality occurs in the detection system of the cell voltages Vcel, there is no need for emergency drive upon the occurrence of an abnormality in the detection system of the cell voltages Vcel. The CPU 52 accordingly terminates this routine.

Figure 3:
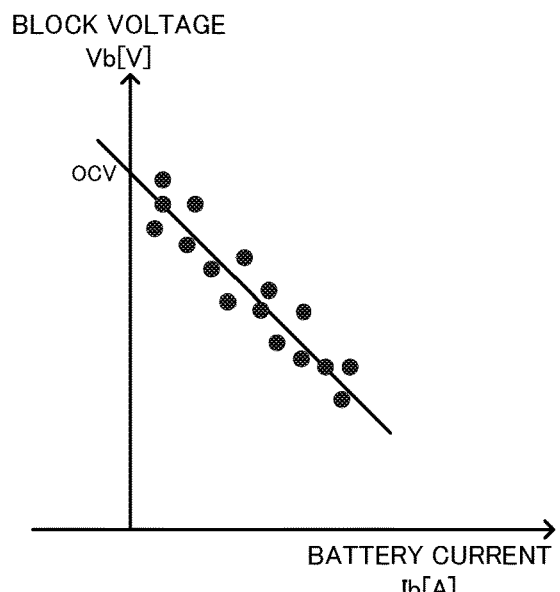
FIG. 3 is a diagram illustrating one example of determining an open circuit voltage OCV of a block by using a number N of block voltages Vb and battery currents Ib.

When it is determined at step S100 that an abnormality occurs in the detection system of the cell voltages Vcel, the CPU 52 obtains inputs of a number N of the block voltages Vb and the battery currents Ib detected in a predetermined time period (step S110) and calculates an open circuit voltage OCV of the block, based on the number N of the block voltages Vb and the battery currents Ib (step S120). The predetermined time period used may be, for example, a time period when this routine is repeatedly performed. For example, when the predetermined time period is 30 seconds and a detection interval of the block voltage Vb and the battery current Ib is 100 msec, 300 block voltages Vb and 300 battery currents Ib are obtained. According to the embodiment, a straight line indicating a variation in block voltage Vb against the battery current Ib is determined by applying the least squares method to the obtained number N of the block voltages Vb and the battery currents Ib, and an intercept of this straight line (intersection with a voltage axis) is calculated as the open circuit voltage OCV of the block. FIG. 3 shows one example of determining the open circuit voltage OCV of the block by using the number N of the block voltages Vb and the battery currents Ib.

The CPU 52 subsequently determines whether the calculated open circuit voltage OCV of the block is higher than an open circuit voltage OCV of the block calculated in a previous cycle of this routine (hereinafter referred to as "previous OCV") and thereby determines whether the open circuit voltage OCV of the block has an increase or not (step S130). When the open circuit voltage OCV of the block has no increase, the CPU 52 prohibits regenerative control of the motor 32 (step S140), gives permission to the emergency drive (step S150), and then terminates this routine. It is here assumed that this routine is performed for the first time after an abnormality occurs in the detection system of the cell voltages Vcel. In this case, the open circuit voltage OCV of the block is calculated for the first time, so that it is determined at step S130 that the open circuit voltage OCV of the block has no increase. Accordingly, the CPU 52 prohibits regenerative control of the motor 32 and gives permission to the emergency drive. Upon the occurrence of an abnormality in the detection system of the cell voltages Vcel, the regenerative control of the motor 32 is prohibited. The battery 35 is accordingly not charged but is only discharged by the emergency drive.

When it is determined at step S130 that the open circuit voltage OCV of the block has an increase, the CPU 52 determines that the battery 35 is being charged (step S160), stops driving of the vehicle (step S170) and then terminates this routine. This means prohibition of the emergency drive. As described above, when an abnormality occurs in the detection system of the cell voltages Vcel, the regenerative control of the motor 32 is prohibited, so that the battery 35 is not charged. In some cases, however, the battery 35 may be slightly charged due to a sensor error or the like. Charging the battery 35 in this case causes overcharge of the battery 35 and results in damaging the cells of the battery 35. The embodiment prohibits the emergency drive, in order to avoid such overcharge of the battery 35 and resulting damage of the cells. The open circuit voltage OCV of the block is related to the state of charge SOC of the block, and an increase in the open circuit voltage OCV of the block indicates an increase in the state of charge SOC of the block. It is accordingly determined that the battery 35 is being charged, based on the increase in the open circuit voltage OCV of the block.

As described above, when an abnormality occurs in the detection system of the cell voltages Vcel, the electric vehicle 20 of the embodiment detects a number N of voltages Vb of a cell block consisting of a predetermined number of cells (for example, 10 cells or 20 cells) (block voltages Vb) and battery currents Ib in a predetermined time period, and calculates the open circuit voltage OCV of the block from the number N of the block voltages Vb and the battery currents Ib. The electric vehicle 20 of the embodiment subsequently determines whether the open circuit voltage OCV of the block has an increase or not and thereby determines whether the battery 35 is being charged. Even when an abnormality occurs in the detection system of the cell voltages Vcel, it is determinable whether the battery 35 is being charged by using the block voltages Vb and the battery currents Ib. When the open circuit voltage OCV of the block has no increase, the electric vehicle 20 of the embodiment prohibits the regenerative control of the motor 32 and gives permission to the emergency drive. When the open circuit voltage OCV of the block has an increase, on the other hand, the electric vehicle 20 of the embodiment determines that the battery 35 is being charged and stops driving of the vehicle (i.e., prohibits the emergency drive). Even when an abnormality occurs in the detection system of the cell voltages Vcel, this configuration allows for the emergency drive and reduces a possible trouble caused by charging of the battery 35 due to a sensor error or the like (trouble caused by overcharge of the battery 35) during this emergency drive.

When an abnormality occurs in the detection system of the cell voltages Vcel, the electric vehicle 20 of the embodiment detects the number N of the voltages Vb of the cell block (block voltages Vb) and the battery currents Ib in the predetermined time period, and determines whether the battery 35 is being charged, based on the open circuit voltage OCV that is obtained from the number N of the block voltages Vb and the battery currents Ib. The number of cells consisting of the cell block may be any number of not less than 2. Accordingly, a modification may detect the number N of the voltages VB of the battery 35 by the voltage sensor 35a and the battery currents Ib in the predetermined time period and may determine whether the battery 35 is being charged, based on the open circuit voltage OCV that is obtained from the number N of the voltages VB of the battery 35 and the battery currents Ib.

When an abnormality occurs in the detection system of the cell voltages Vcel, the electric vehicle 20 of the embodiment detects the number N of the voltages Vb of the cell block (block voltages Vb) and the battery currents Ib in the predetermined time period that is the activation time interval of the emergency drive permission/prohibition process routine. According to a modification, the time period when the number N of the block voltages Vb and the battery currents Ib are detected may be a shorter time period than the activation time interval of the emergency drive permission/prohibition process routine.

The above embodiment describes the application of the present disclosure to the electric vehicle 20. The present disclosure may also be applied to a hybrid vehicle.

In the electrically driven vehicle of the above aspect, the control derive may calculate the open circuit voltage of the block from the voltages of the block and the battery currents that are detected a plurality of times in a predetermined time period, and determine that the battery is being charged when the open circuit voltage of the block has an increase. The open circuit voltage of the block is related to the state of charge of the block (the rate of remaining capacity). An increase in the open circuit voltage accordingly indicates an increase in the state of charge. This means that the battery is being charged. A procedure of the calculation of the open circuit voltage from the voltages of the block and the battery currents may determine a linear relationship of the voltage of the block to the battery current by applying, for example, the least squares method to the voltages of the block and the battery currents that are detected a plurality of times in the predetermined time period and specify an intercept of the linear relationship as the open circuit voltage of the block.

In the electrically driven vehicle of the above aspect, when determining that the battery is being charged on occurrence of an abnormality in the cell voltage detection system, the control device may stop the electrically driven vehicle. This configuration suppresses the battery from being charged (overcharged) and thereby suppresses the cells from being damaged.

The following describes the correspondence relationship between the primary components of the embodiment and the primary components of the disclosure described in Summary. The battery 35 of the embodiment corresponds to the "battery", the motor 32 corresponds to the "motor", the electronic control unit 50 corresponds to the "control device".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The disclosure is applicable to, for example, the manufacturing industries of electrically driven vehicles.

The invention claimed is:

1. An electrically driven vehicle, comprising:
   a battery configured by connecting a plurality of cells in series;
   a motor configured to transmit electric power to and from the battery; and
   a control device configured to drive and control the motor, wherein
   when an abnormality occurs in a cell voltage detection system configured to detect cell voltages of the plurality of cells constituting the battery, the control device prohibits regenerative control of the motor and determines whether the battery is being charged, based on an open circuit voltage of a block that is comprised of at least two or more cells among the plurality of cells constituting the battery, wherein the open circuit voltage of the block is calculated from a voltage of the block and a battery current flowing in the battery.

2. The electrically driven vehicle according to claim 1, wherein the control device calculates the open circuit voltage of the block from cell voltages of the block and from battery currents that are detected a plurality of times in a predetermined time period, and determines that the battery is being charged when the open circuit voltage of the block has an increase.

3. The electrically driven vehicle according to claim 1, wherein when determining that the battery is being charged on occurrence of an abnormality in the cell voltage detection system, the control device stops the electrically driven vehicle.

4. The electrically driven vehicle according to claim 2, wherein when determining that the battery is being charged on occurrence of an abnormality in the cell voltage detection system, the control device stops the electrically driven vehicle.

* * * * *